United States Patent [19]

Kaidoo et al.

[11] Patent Number: 5,019,617

[45] Date of Patent: May 28, 1991

[54] RUBBER COMPOSITIONS CONTAINING CARBON BLACKS OF SPECIFIED PHYSICAL CHARACTERISTICS

[75] Inventors: Hiroyuki Kaidoo, Yokohama; Takao Muraki, Hiratsuka, both of Japan

[73] Assignee: The Yokohama Rubber Co., Ltd., Japan

[21] Appl. No.: 412,533

[22] Filed: Sep. 21, 1989

Related U.S. Application Data

[63] Continuation of Ser. No. 281,738, Dec. 9, 1988, abandoned.

[30] Foreign Application Priority Data

Dec. 9, 1987 [JP] Japan ................................ 62-309469

[51] Int. Cl.$^5$ ............................................. C08K 3/04
[52] U.S. Cl. .................................... 524/346; 524/496; 524/566; 524/575; 524/575.5; 525/164
[58] Field of Search ................ 524/346, 496; 525/164

[56] References Cited

U.S. PATENT DOCUMENTS

| | | | |
|---|---|---|---|
| 3,638,702 | 2/1972 | Endter | 525/164 |
| 4,442,163 | 4/1984 | Kühner et al. | 524/346 |

FOREIGN PATENT DOCUMENTS

| | | | |
|---|---|---|---|
| 62-030137 | 2/1987 | Japan | 524/496 |
| 62-057433 | 3/1987 | Japan | 524/496 |

*Primary Examiner*—Joseph L. Schofer
*Assistant Examiner*—Mark Sweet
*Attorney, Agent, or Firm*—Finnegan, Henderson, Farabow, Garrett & Dunner

[57] ABSTRACT

Rubber compositions are disclosed which exhibit enhanced dynamic modulus and tensile strength characteristics. A selected type of carbon black, resorcinsol and/or its precondensate and hexamethoxymethyl melamine are combined in specified amounts with a selected class of starting rubbers. The carbon black has specified nitrogen adsorption surface area, dibutyl phthalate adsorptivity and Dst mode of diameter.

4 Claims, 3 Drawing Sheets composition B

1 : N339　　3 : N326
2 : N330　　4 : inventive carbon black

RUBBER COMPOSITIONS CONTAINING CARBON BLACKS OF SPECIFIED PHYSICAL CHARACTERISTICS

This application is a continuation of application Ser. No. 07/281,738, filed Dec. 9, 1988, now abandoned.

BACKGROUND OF THE INVENTION

1. Field of the Invention

This invention relates to rubber compositions suitable for use particularly in automobile tires.

2. Description of the Prior Art

Rubber compositions of a high degree of hardness are in common use for belt and bead filler portions of automotive tires. To attain improved hardness, attempts have been made to blend a given starting rubber with large amounts of carbon black. Too much carbon black, say greater than 50 parts by weight based on 100 parts by weight of the starting rubber, however, will in most cases render the finished composition mechanically weak for example with respect to tensile strength on break. As is generally known in the art, this problem can be alleviated to some extent by the use of a low structure carbon black not abundant in dibutyl phthalate adsorptivity. To this end, N326 is oftentimes employed which is a carbon black of a lower structure type than a standard N330 type among high abrasion furnace blacks (HAF). Various N326 carbon blacks have been proposed as disclosed for instance in Japanese Laid-Open Publication Nos. 50-60904, 59-89339 and 60-4540.

Prior high-hardness rubber compositions leave their mechanical strength characteristics unsolved. These compositions when formulated to provide a dynamic modulus greater than 6.0 MPa involve too small tensile strength to meet the commercial requirements.

SUMMARY OF THE INVENTION

The present invention, therefore, seeks to provide new and improved rubber compositions which excel, in addition to increased dynamic modulus, in tensile strength on break among various important mechanical strength characteristics. The composition according to the invention is suitable particularly for use in steel cords and bead fillers of car tires.

As will be better understood from the following detailed description, the invention provides a rubber composition comprising (a) 100 parts by weight of a starting rubber, (b) 0.5 to 5 parts by weight of a resorcinol, a precondensate thereof or a combination thereof, (c) 1 to 5 parts by weight of a hexamethoxymethylmelamine and (d) 50 to 70 parts by weight of a carbon black having an $N_2SA$ of 90 to 100 $m^2/g$ as defined by nitrogen adsorption surface area, a DBP of 60 to 70 ml/100 g as defined by dibutyl phthalate adsorption and a $\Delta Dst$ of 50 to 60 m$\mu$ as defined by the Dst mode of diameter, whereby the composition has an E' of not less than 6.0 MPa as defined by dynamic modulus and determined at an initial strain of 10% and subsequently at a dynamic strain of 2%, at a frequency of 20 Hz and at a temperature of 20° C.

DETAILED DESCRIPTION OF THE INVENTION

Rubber compositions according to the present invention are essentially made up of (I) a selected type of carbon black, (II) a resorcinol and/or its precondensate and (III) a hexamethoxymethylmelamine combined with a selected class of starting rubbers.

Components (I) useful for the purpose of the invention include carbon blacks having certain physical characteristics determinable by the following methods.

Nitrogen Adsorption Surface Area ($N_2SA$)($m^2/g$)

ASTM D-3037-78 is followed by "Standard Method of Testing Carbon Black-Surface Area by Nitrogen Adsorption", Method C.

Dibutyl Phthalate Adsorption (DBP)(ml/100 g)

JIS K-6221 (1982) is followed by "Method of Testing Carbon Black for Rubber", Section 6.1.2(1), Method A.

Dst Mode of Diameter and Aggregate Size Distribution ($\Delta Dst$)(m$\mu$)

Figure 3:
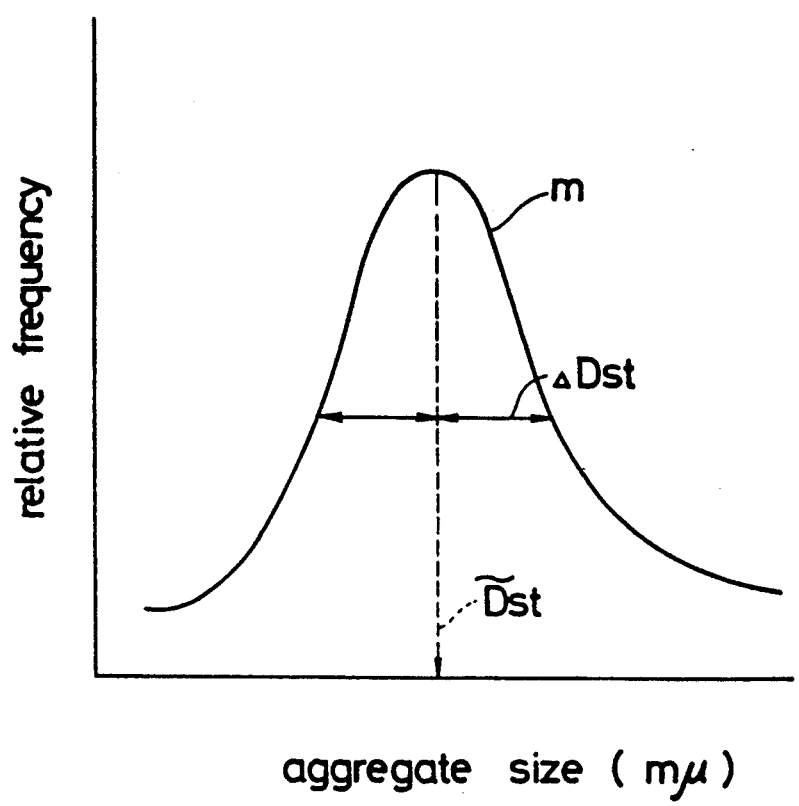
FIG. 3 is a graphic representation exemplary of a size distribution curve of centrifugally classified carbon black aggregates for use in the determination of the Dst mode of diameter.

Centrifugal classification is effected with the use of a disc centrifuge manufactured by Joyce Loebl Co., England. A carbon black sample is dried as stipulated in JIS K-6221, 5th Method, followed by accurate weighing and dispersion in a 20% aqueous ethanol solution, thereby preparing a dispersion concentrated to 0.005% by weight. Complete dispersion is ultrasonically accomplished. The resulting dispersion is subjected to the above centrifuge set at 8,000 rpm. Into the centrifuge are put 10 ml of a spin liquid in distilled water, subsequently 0.5 ml of a buffer in 20% by volume of ethanol and finally 0.5 to 1.0 ml of the carbon black dispersion through a syringe. Centrifugation is initiated and a photoelectric recorder switched on to draw a distribution curve of aggregates as shown in FIG. 3. $\Delta Dst$ is determined from the half value width of this curve.

Dynamic Modulus (E')(MPa)

A vulcanized rubber sheet is allowed to stretch at 10% initial strain and then at 2% dynamic strain, at 20 Hz and at 20° C.

According to one important aspect of the invention, component (I) should have a $N_2SA$ in the range of 90 to 100 $m^2/g$, a DBP in the range of 60 to 70 ml/100 g and $\Delta Dst$ in the range of 50 to 60 m$\mu$. Improved dynamic modulus (E') and enhanced tensile strength on break (Tb) are governed by strict observance of component (I) within the above specified ranges.

The amount of component (I) to be used should be in the range of 50 to 70 parts, preferably 55 to 65 parts, based on 100 parts by weight of a given strating rubber. Component (I) if smaller amounts than 50 parts would not be ineffective in producing sufficient reinforcement and if larger amounts than 70 parts would not get fully compatible with the other components, leading to inadequate tensile strength.

Components (III) include a resorcinol, its precondensate and their combination, and they act to gain improved mechanical properties. This component should range in amount from 0.5 to 3 parts, preferably 1 to 2.5 parts, per 100 parts by weight of the starting rubber.

Smaller amounts than 0.5 part would fail to give improved mechanical strength, whereas greater amounts than 3 parts would invite reduced tensile strength.

Components (II) are selected from hexamethoxymethylmelamines (HMMM) which are used to make the resulting composition highly adhesive to tire reinforcing materials such as steel cords in particular. The amount of component (III) to be added should preferably be between 1 and 5 parts per 100 parts by weight of the starting rubber. Too much component (III) would result in a rubber composition being physically poor.

Starting rubbers useful in the practice of the invention vary with the particular area of application of the composition, but include for example natural rubber (NR), polyisoprene rubber (IR), butyl rubber (IIR), acrylonitrile-butadienene copolymer rubber (NBR), styrene-butadiene copolymer rubber (SBR), butadiene rubber (BR) and their combinations. Preferred for use in automobile tires is NR or a blend of NR and IR. NR or NR—IR should be added in amounts more than 70% by weight of the total starting rubber.

Various other additives may be employed, if necessary, in which are included vulcanization accelerators, sulfur, antioxidants, zinc oxide, cobalt salts of organic acids, process oils and the like.

The following examples are provided to further illustrate the present invention, but should not be regarded as limiting the invention.

Different rubber compositions were prepared by blending Formulations A and B with varying amounts of four carbon blacks, i.e. N339, N330, N326 and inventive carbon black, as shown in Tables 1 and 2. Contained in Formulation B were resorcinol and HMMM. Formulation A was devoid of two such components with a large amount of sulfur used.

Vulcanization was effected at 160° C. for 15 minutes to form a rubber sheet which was subsequently measured for tensile strength (Tb) and dynamic modulus (E′).

As seen from Table 3, Formulations A and B when combined with the test carbon blacks at five levels show Tb and E′ values that are rather irregular and hence difficult to put one above the other. To facilitate comparison, these values have been rearranged in accordance with the method of least squares as given in Table 4 in terms of the correlation coefficients of Tb and E′ converted from the regression equations.

Figure 1:
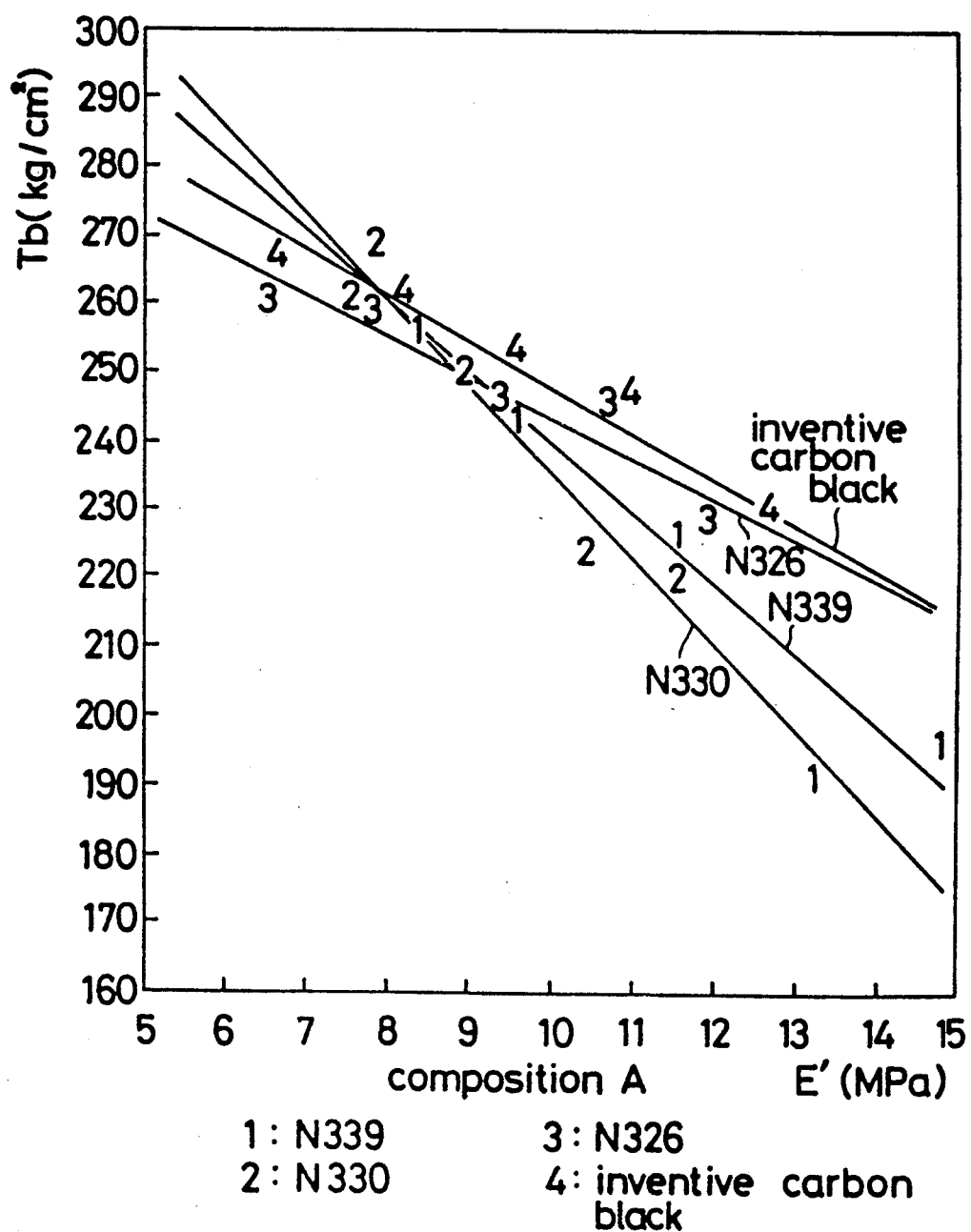
FIGS. 1 and 2 are graphic representations of the physical properties of different rubber compositions, showing the correlation between tensile strength on break (Tb) and dynamic modulus (E') converted by the method of least squares.
Figure 2:
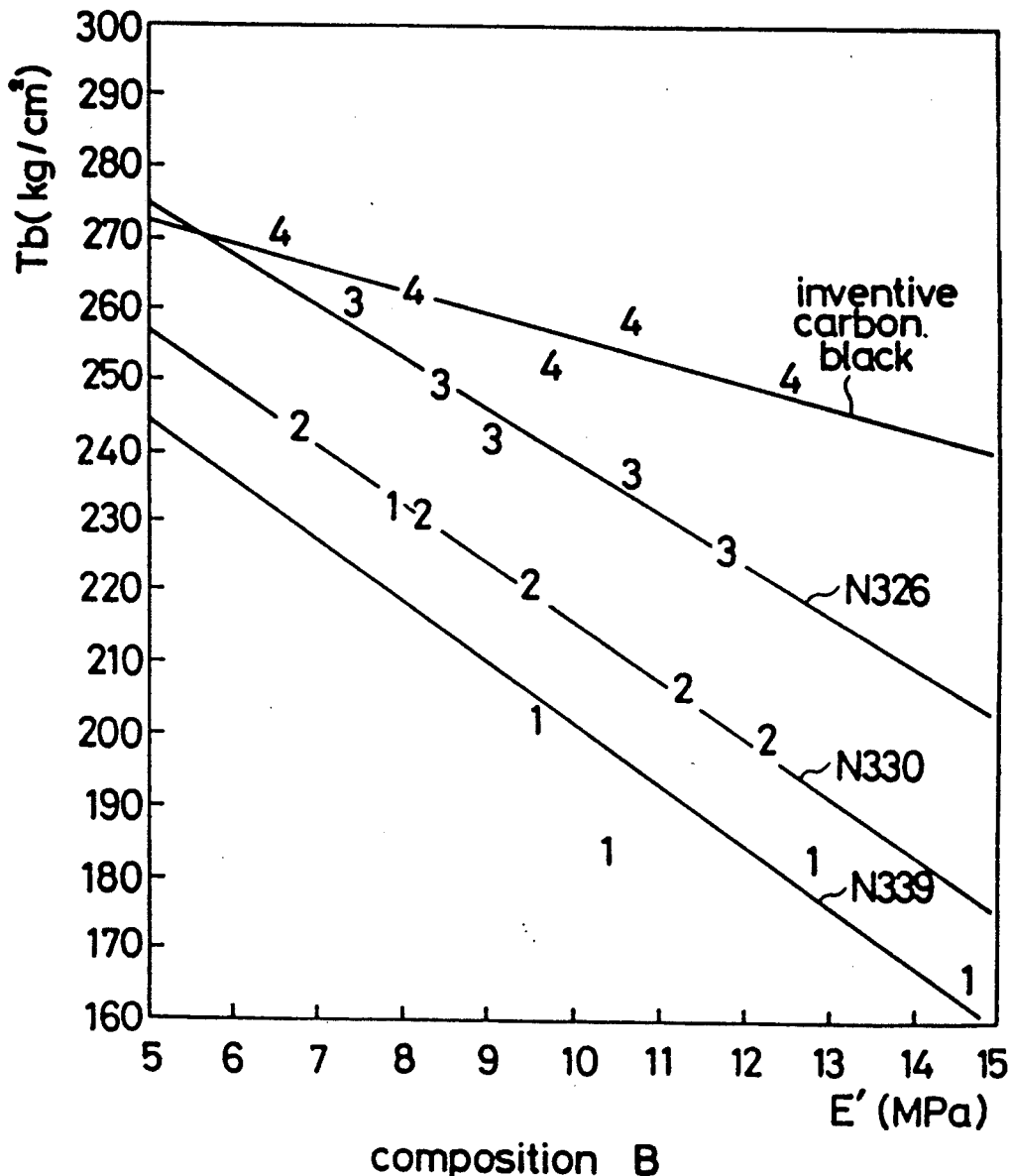

The data in Table 5 demonstrate the Tb values of Formulations A and B determined relative to the E′ values converted above. Parentheses indicate the magnitude of Tb computed by taking N326 as an index of 100. The Tb values are also plotted against E′ in FIGS. 1 and 2.

The greater the dynamic modulus (E′) is, the smaller tensile strength (Tb) whatever type of carbon black may be as is apparent from Table 5. Among N339, N330 and N326 commonly known in the art, N326 excels in Tb on a high E′ side, i.e. at from 9.0 to 12.0 MPa, in Formulation A and also over the entire E′ range, i.e. at from 5.0 to 12.0 MPa, in Formulation B.

The carbon black contemplated under the invention, given relatively high Tb at 5.0 and 6.0 MPa, shows no appreciable rise in Tb as E′ increases in the case of Formulation A. Surprisingly, the inventive carbon black, though slightly lower in Tb than N326 at 5.0 MPa, is highly capable of Tb improvement at from 6.0 to 12.0 MPa in Formulation B. The beneficial effects of the invention are attributable to the use of the unique carbon black combined with resorcinol and HMMM.

Although the invention has been shown and described in connection with certain preferred embodiments, it will be apparent to those skilled in the art that many changes and modifications may be made without departing from the scope of the appended claims.

TABLE 1

| component/additive | formulation A | formulation B |
|---|---|---|
| NR | 100.0 | 100.0 |
| ZnO | 10.0 | 10.0 |
| antioxidant (6C)* | 1.0 | 1.0 |
| cobalt naphthenate (10% Co content) | 2.0 | 2.0 |
| process oil | 2.0 | 2.0 |
| accelerator (OBS) | 0.5 | 0.5 |
| insoluble sulfur (80%) | 8.0 | 4.0 |
| resorcinol | — | 2.0 |
| HMMM** | — | 3.5 |
| carbon black | varying amount | |

*N-phenyl-N′-(1,3-dimethylbutyl)-p-phenylenediamine
**hexamethoxymethylmelamine

TABLE 2

| carbon black | $N_2SA$ (m²/g) | DBP (ml/100 g) | Dst (mμ) | ΔDst (mμ) |
|---|---|---|---|---|
| N339 Seast KH | 93 | 121 | 105 | 71 |
| N330 Seast 3 | 79 | 101 | 111 | 66 |
| N326 Seast 300 | 86 | 74 | 98 | 65 |
| inventive carbon black | 94 | 66 | 78 | 56 |

Seast series: Tokai Carbon Co., Ltd.

TABLE 3

| carbon black | amount (phr) | formulation A Tb | formulation A E′ | formulation B Tb | formulation B E′ |
|---|---|---|---|---|---|
| N339 | 50 | 257 | 8.37 | 231 | 7.93 |
|  | 55 | 244 | 9.56 | 202 | 9.64 |
|  | 60 | 226 | 11.51 | 183 | 10.44 |
|  | 65 | 191 | 13.33 | 181 | 12.91 |
|  | 70 | 196 | 14.90 | 167 | 14.77 |
| N330 | 50 | 268 | 7.86 | 242 | 6.74 |
|  | 55 | 260 | 7.61 | 230 | 8.22 |
|  | 60 | 250 | 8.90 | 220 | 9.51 |
|  | 65 | 224 | 10.36 | 206 | 11.28 |
|  | 70 | 220 | 11.55 | 198 | 12.32 |
| N326 | 50 | 262 | 6.54 | 259 | 7.38 |
|  | 55 | 258 | 7.74 | 248 | 8.42 |
|  | 60 | 246 | 9.38 | 240 | 9.04 |
|  | 65 | 245 | 10.68 | 236 | 10.64 |
|  | 70 | 229 | 11.89 | 225 | 11.81 |
| inventive carbon black | 50 | 268 | 6.68 | 269 | 6.54 |
|  | 55 | 262 | 8.13 | 261 | 8.08 |
|  | 60 | 253 | 9.59 | 251 | 9.69 |
|  | 65 | 246 | 10.76 | 256 | 10.66 |
|  | 70 | 230 | 12.60 | 249 | 12.52 |

TABLE 4

| run | | regression equation | correlation coefficient (r) |
|---|---|---|---|
| formulation A | N339 | Tb = 343.34 − 10.45 × (E′) | 0.96 |
|  | N330 | Tb = 358.69 − 12.35 × (E′) | 0.97 |
|  | N326 | Tb = 301.40 − 5.78 × (E′) | 0.96 |
|  | inventive carbon black | Tb = 312.89 − 6.40 × (E′) | 0.99 |
| formulation B | N339 | Tb = 285.42 − 8.32 × (E′) | 0.91 |
|  | N330 | Tb = 294.94 − 7.88 × (E′) | 1.00 |
|  | N326 | Tb = 308.03 − 7.02 × (E′) | 0.97 |
|  | inventive | Tb = 287.40 − 3.18 × (E′) | 0.91 |

TABLE 4-continued

| run | regression equation | correlation coefficient (r) |
|---|---|---|
| carbon black | | |

TABLE 5

| E' (MPa) converted | | 5.0 | 6.0 | 7.0 | 8.0 | 9.0 | 10.0 | 11.0 | 12.0 |
|---|---|---|---|---|---|---|---|---|---|
| formulation A | N339 | 291 (107) | 281 (105) | 270 (103) | 260 (102) | 249 (100) | 239 (98) | 228 (96) | 218 (94) |
| | N330 | 297 (109) | 285 (107) | 272 (104) | 260 (102) | 248 (100) | 235 (96) | 223 (94) | 221 (91) |
| | N326 | 273 (100) | 267 (100) | 261 (100) | 255 (100) | 249 (100) | 244 (100) | 238 (100) | 232 (100) |
| | inventive carbon black | 281 (103) | 274 (103) | 268 (103) | 262 (103) | 255 (102) | 249 (102) | 243 (102) | 236 (102) |
| formulation B | N339 | 244 (89) | 236 (89) | 227 (88) | 219 (87) | 211 (89) | 202 (85) | 194 (84) | 186 (83) |
| | N330 | 256 (94) | 248 (93) | 240 (93) | 232 (92) | 224 (91) | 216 (91) | 208 (90) | 200 (89) |
| | N326 | 273 (100) | 266 (100) | 259 (100) | 252 (100) | 245 (100) | 238 (100) | 231 (100) | 224 (100) |
| | inventive carbon black | 272 (100) | 268 (101) | 265 (102) | 262 (104) | 259 (106) | 256 (108) | 252 (109) | 249 (111) |

What is claimed is:
1. A rubber composition comprising:
  (a) 100 parts by weight of a starting rubber;
  (b) 0.5 to 5 parts by weight of a resorcinol, a precondensate thereof or a combination thereof;
  (c) 1 to 5 parts by weight of a hexamethoxymethylmelamine; and
  (d) 50 to 70 parts by weight of a carbon black having an $N_2SA$ of 90 to 100 $m^2/g$ as defined by nitrogen adsorption surface area, a DBP of 60 to 70 ml/100 g as defined by dibutyl phthalate adsorption and a $\Delta Dst$ of 50 to 60 m$\mu$ as defined by the Dst mode of diameter, whereby the composition has an E' of not less than 6.0 MPa as defined by dynamic modulus and determined at an initial strain of 10% and subsequently at a dynamic strain of 2%, at a frequency of 20 Hz and at a temperature of 20° C.

2. A rubber composition according to claim 1 wherein said starting rubber is selected from the group consisting of natural rubber, polyisoprene rubber, acrylonitrile-butadiene copolymer rubber, styrene-butadiene copolymer rubber, butadiene rubber and combinations thereof.

3. A rubber composition according to claim 2 wherein said starting rubber is natural rubber or a blend of natural rubber and polyisoprene rubber.

4. A rubber composition according to claim 3 wherein each of said natural rubber and rubber blend is in an amount of more than 70% by weight of said starting rubber.

* * * * *

UNITED STATES PATENT AND TRADEMARK OFFICE
CERTIFICATE OF CORRECTION

PATENT NO. : 5,019,617
DATED : May 28, 1991
INVENTOR(S) : Hiroyuki Kaidoo, Tako Muraki It is certified that error appears in the above-identified patent and that said Letters Patent is hereby corrected as shown below:

Column 2, line 64, change "(III)" to --(II)--.

Column 3, line 4, change "(II)" to --(III)--.

Signed and Sealed this

Fifth Day of January, 1993

*Attest:*

DOUGLAS B. COMER

*Attesting Officer*     *Acting Commissioner of Patents and Trademarks*